US007624266B2

United States Patent
Gábor

(10) Patent No.: US 7,624,266 B2
(45) Date of Patent: Nov. 24, 2009

(54) SYSTEM AND METHOD USING TEMPORARY IDENTITY FOR AUTHENTICATION WITH SESSION INITIATION PROTOCOL

(75) Inventor: Bajkó Gábor, Rezeda (HU)

(73) Assignee: Nokia Corporation, Espoo (FI)

( * ) Notice: Subject to any disclaimer, the term of this patent is extended or adjusted under 35 U.S.C. 154(b) by 680 days.

(21) Appl. No.: 10/384,058

(22) Filed: Mar. 7, 2003

(65) Prior Publication Data

US 2003/0229787 A1 Dec. 11, 2003

Related U.S. Application Data

(60) Provisional application No. 60/366,264, filed on Mar. 22, 2002.

(51) Int. Cl.
*H04L 29/00* (2006.01)
(52) U.S. Cl. ...................................... 713/168
(58) Field of Classification Search ................. 713/168; 726/8, 5; 455/560; 709/230
See application file for complete search history.

(56) References Cited

U.S. PATENT DOCUMENTS

| 6,707,813 | B1* | 3/2004 | Hasan et al. ................. 370/356 |
| 7,024,688 | B1* | 4/2006 | Faccin et al. .................... 726/4 |
| 7,155,222 | B1* | 12/2006 | Jain et al. ................. 455/435.1 |
| 2001/0048745 | A1* | 12/2001 | Sheymov et al. ............ 380/247 |
| 2003/0159067 | A1* | 8/2003 | Stirbu .......................... 713/201 |

OTHER PUBLICATIONS

3G TS 33.203 Technical Specification, 3rd Generation Partnership Project, Technical Specification Group SA3; Access security for IP-based services.*
3GPP TS 24.228 v.5.3.0, Sections 6, 6.1, 6.2 through 6.2-22 (10 pages).

* cited by examiner

*Primary Examiner*—Andrew L Nalven
(74) *Attorney, Agent, or Firm*—Mintz, Levin, Cohn, Ferris, Glovsky and Popeo, P.C.

(57) ABSTRACT

A communication method and a communication system providing services for subscribers having private identities is disclosed. The method includes receiving at a network element (S-CSCF) a communication from user equipment (UE) including a private identity of the subscriber and assigning a random string to the private identity.

19 Claims, 2 Drawing Sheets

SYSTEM AND METHOD USING TEMPORARY IDENTITY FOR AUTHENTICATION WITH SESSION INITIATION PROTOCOL

CROSS REFERENCE TO RELATED APPLICATION

This application claims the benefit of the filing date of Provisional Patent Application Ser. No. 60/366,264, filed on Mar. 22, 2002, entitled "Using Temporary IMPI (Private Identity) in IMS with SIP", which application is incorporated herein by reference in its entirety.

BACKGROUND OF THE INVENTION

1. Field of the Invention

The invention relates to authentication and, more particularly, how authentication is performed in a communication network according to the Internet Protocol Multimedia System (IMS) of the 3rd Generation Partnership Project (3GPP).

2. Description of the Prior Art

FIG. 1 shows the registration signaling flow for a user to become registered. For the purpose of this registration signaling flow, the subscriber UE is considered to be roaming. This flow also shows the authentication of the private user identity. The signaling flow is from 3GPP TS 24 228 V5.3.0 which is incorporated herein by reference in its entirety. In this signaling flow, the home network does not have an active network hiding configuration. The steps of registration are described in a sequence following with the numbered paragraphs below which correspond to the numbered steps of FIG. 1:

1. GPRS Attach/PDP Context Establishment and proxy call state control function (P-CSCF) Discovery (UE to GPRS)

This signaling flow is shown to indicate prerequisites for the registration signaling.

2. REGISTER request (UE to P-CSCF)

The purpose of this request is to register the user's SIP URI with a serving call state control function (S-CSCF) in the home network. This request is routed to the P-CSCF because it is the only SIP server known to the UE. In the following SIP request, the Contact field contains the user's host address.

The P-CSCF performs two actions, binding and forwarding. The binding is between the User's SIP address (user1_public1@home1.net) and the host (terminal) address ([5555::aaa:bbb:ccc:ddd]) which was acquired during PDP context activation process.

| | |
|---|---|
| Request-URI: | The Request-URI (the URI that follows the method name, "REGISTER", in the first line) indicates the destination domain of this REGISTER request. The rules for routing a SIP request describe how to use directory name service (DNS) to resolve this domain name ("registrar.home1.net") into an address or entry point into the home operator's network (the I-CSCF). This information is stored in the USIM. |
| Via: | IPv6 address of the SIP session allocated during the PDP Context Activation process. |
| From: | This indicates the public user identity originating the REGISTER request. The public user identity may be obtained from the USIM. |
| To: | This indicates the public user identity being registered. This is the identity by which other parties know the subscriber. It may be obtained from the USIM. |
| Contact: | This indicates the point-of-presence for the subscriber - the IP address of the UE. This is the temporary point of contact for the subscriber that is being registered. Subsequent requests destined for this subscriber will be sent to this address. This information is stored in the P-CSCF and S-CSCF. |
| Authorization: | It carries authentication information. The private user identity (user1_private@home1.net) is carried in the user name field of the Digest AKA protocol. The URI parameter (directive) contains the same value as the Request-URI. The realm parameter (directive) contains the network name where the username is authenticated. The Request-URI and the realm parameter (directive) value are obtained from the same field in the USIM and therefore, are identical. |
| Security-Client: | lists the supported algorithm(s) by the UE. |
| Supported: | This header is included to indicate to the recipient that the UE supports the Path header. |

Upon receiving this request the P-CSCF sets it's SIP registration timer for the UE to the Expires time in the request.

3. DNS:DNS-Q

Based on the user's URI, the P-CSCF determines that UE is registering from a visiting domain and performs the DNS queries to locate the interrogating call state control function (I-CSCF) in the home network. The look up in the DNS is based on the address specified in the Request URI.

The P-CSCF sends the REGISTER request—after local processing—to the address indicated in the Request-URI. When forwarding the REGISTER request, the P-CSCF needs to specify the protocol, port number and IP address of the I-CSCF server in the home network to which to send the REGISTER request. The P-CSCF tries to find this information by querying the DNS. Since the Request-URI does not specify a numeric IP address, and the transport protocol and port number are not indicated, the P-CSCF performs a naming authority pointer (NAPTR) query for the domain specified in the Request-URI.

Once the IP address of the I-CSCF is obtained, the P-CSCF forwards the REGISTER request to this IP address (i.e. 5555::aba:dab:aaa:daa) using the UDP protocol and port number 5060.

4. REGISTER request (P-CSCF to I-CSCF)

The P-CSCF needs to be in the path for all mobile originated and mobile terminated requests for this user. To ensure this, the P-CSCF adds itself to the Path header value for future requests.

The P-CSCF binds the public user identity under registration to the Contact header supplied by the user.

The P-CSCF adds also the P-Visited-Network-ID header with the contents of the identifier of the P-CSCF network. This may be the visited network domain name or any other identifier that identifies the visited network at the home network.

This signaling flow shows the REGISTER request being forward from the P-CSCF to the I-CSCF in the home domain.

| | |
|---|---|
| Path: | This is the address of the P-CSCF and is included to inform the S-CSCF where to route terminating sessions. |

-continued

| | |
|---|---|
| Require: | This header is included to ensure that the recipient correctly handles the Path header. If the recipient does not support the path header, a response will be received with a status code of 420 and an Unsupported header indicating "path". Such a response indicates a misconfiguration of the routing tables and the request has been routed outside the IM CN subsystem. |
| P-Visited-Network-ID: | It contains the identifier of the P-CSCF network at the home network. |
| P-Charging-Vector: | The P-CSCF inserts this header and populates the IMS Charging Id (ICID) parameters with a unique value and the IP address of the P-CSCF. |

5. Cx: User registration status query procedure

The I-CSCF makes a request for information related to the Subscriber registration status by sending the private user identity, public user identity and visited domain name to the HSS. The HSS returns the S-CSCF required capabilities and the I-CSCF uses this information to select a suitable S-CSCF.

For detailed message flows see 3GPP TS 29.228.

6. REGISTER request (I-CSCF to S-CSCF)

I-CSCF does not modify the Path header.

This signaling flow forwards the REGISTER request from the I-CSCF to the S-CSCF selected.

Path: The S-CSCF stores the contents of the Path header and uses the URI for routing mobile terminated sessions.

Upon receiving this request the S-CSCF may set its SIP registration timer for this UE to the Expires time in this request or the S-CSCF may assign another registration timer for this registration.

7. Cx: Authentication procedure

Since the REGISTER request arrived without integrity protection to the P-CSCF, the S-CSCF shall challenge it. For this, the S-CSCF requires at least one authentication vector to be used in the challenge to the user. If a valid authentication vector (AV) is not available, then the S-CSCF requests at least one AV from the HSS.

The S-CSCF indicates to the HSS that it has been assigned to serve this user.

For detailed message flows see 3GPP TS 29.228.

8. Authentication vector selection

The S-CSCF selects an authentication vector for use in the authentication challenge. For detailed description of the authentication vector, see 3GPP TS 33.203.

The authentication vector may be of the form as in 3GPP TS 33.203 (if IMS AKA is the selected authentication scheme):

AV=$RAND_n \| AUTN_n \| XRES_n \| CK_n \| IK_n$ where:

RAND: random number used to generate the XRES, CK, IK, and part of the AUTN. It is also used to generate the RES at the UE.

AUTN: Authentication token (including MAC and SQN).

XRES: Expected (correct) result from the UE.

CK: Cipher key (optional).

IK: Integrity key.

9. 401 Unauthorized response (S-CSCF to I-CSCF)

The authentication challenge is sent in the 401 Unauthorized response towards the UE.

WWW-Authenticate: The S-CSCF challenges the user. The nonce includes the quoted string, base64 encoded value of the concatenation of the AKA RAND, AKA AUTN and server specific data. The S-CSCF appends also the Integrity Key (IK) and the Cyphering key (CK).

The actual nonce value in the WWW-Authenticate header field is encoded in base64, and it may look like: nonce="A34Cm+Fva37UYWpGNB34JP".

10. 401 Unauthorized response (I-CSCF to P-CSCF)

The authentication challenge is sent in the 401 Unauthorized response towards the UE.

11. 401 Unauthorized response (P-CSCF to UE)

The P-CSCF removes any keys received in the 401 Unauthorized response and forwards the rest of the response to the UE.

WWW-Authenticate: The P-CSCF removes the IK and CK parameters (directives) from the header.

12. Generation of response and session keys at UE

The UE calculates the response, RES, and also computes the session keys IK and CK. The RES is put into the Authorization header and sent back to the registrar in the REGISTER request.

13. REGISTER request (UE to P-CSCF)

Authorization: This carries the response to the authentication challenge received in step 11 along with the private user identity, the realm, the nonce, the URI and the algorithm.

This message is protected by the IPsec SA negotiated.

14. DNS: DNS-Q

This is according to step 3.

15. REGISTER request (P-CSCF to I-CSCF)

This signaling flow shows the REGISTER request being forwarded from the P-CSCF to the I-CSCF in the home domain.

Path: This is the P-CSCF URI and it is included to inform the S-CSCF where to route terminating sessions.

16. Cx: User registration status query procedure

The I-CSCF requests information related to the Subscriber registration status by sending the private user identity, public user identity and visited domain name to the HSS. The HSS returns the S-CSCF name which was previously selected in step 5 (Cx: User registration status query procedure).

For detailed message flows see 3GPP TS 29.228.

17. REGISTER request (I-CSCF to S-CSCF)

This signaling flow forwards the REGISTER request from the I-CSCF to the S-CSCF.

Path: The S-CSCF stores the contents of the Path header and uses this URI for routing mobile terminated sessions.

P-Charging-Vector: The S-CSCF stores the contents of the ICID parameters for possible charging activities.

18. Authentication

Upon receiving an integrity protected REGISTER request carrying the authentication response, RES, the S-CSCF checks that the user's active, XRES matches the received RES. If the check is successful then the user has been authenticated and the public user identity is registered in the S-CSCF.

19. Cx: S-CSCF registration notification procedure

On registering a user the S-CSCF informs the HSS that the user has been registered at this instance. Upon being requested by the S-CSCF, the HSS will also include the user profile in the response sent to the S-CSCF.

For detailed message flows see 3GPP TS 29.228.

20. 200 OK response (S-CSCF to I-CSCF)

The S-CSCF sends a 200 (OK) response to the I-CSCF indicating that Registration was successful.

Service-Route: The S-CSCF inserts the Service-Route header value that includes the own S-CSCF URI.

21. 200 OK response (I-CSCF to P-CSCF)

The I-CSCF forwards the 200 (OK) response from the S-CSCF to the P-CSCF indicating that Registration was successful.

22. 200 OK response (P-CSCF to UE)

The P-CSCF saves the value of the Service-Route header and associates it with the UE. The P-CSCF then forwards the 200 (OK) response from the I-CSCF to the UE indicating that Registration was successful.

The 3GPP Technical Specification 24.229, which is incorporated by reference in its entirety, in Chapter 5.1.1.1A discusses that a subscriber has multiple IMS Public User Identities (IMPUs) and a single IMS Private User Identity (IMPI). The IMPUs are either explicitly registered or implicitly registered using messages of the Session Initiation protocol (SIP). As a result, the identity to be used for message origin verification in the P-CSCF is still open.

In IMS the user is authenticated in the S-CSCF during registration as has been discussed above. The message origin verification is delegated from the S-CSCF to the P-CSCF. Currently it is not clear how the message origin verification can be done in the P-CSCF. The IMPI is not present in messages other than REGISTER requests and using the IMPUs for this purpose is not appropriate.

One possibility is to include the IMPI into all of the messages initiated by the UE. However this solution is not safe as it exposes the user's IMPI on the air interface.

Currently in 3GPP the implicitly registered IMPUs are transferred from the Home Subscriber Server (HSS) to the S-CSCF and from the S-CSCF to the P-CSCF. The P-CSCF then keeps the user's explicitly and implicitly registered IMPUs together with the session keys IK and CK. Whenever a message arrives, the P-CSCF verifies the integrity protection using IK, then verifies if the identity included in the From: (or RPI) header field relates to that specific IK or not. The Technical Specifications of 3GPP to date are incorporated herein by reference in their entirety.

The current detailed description of the registration and authentication procedure of the 3GPP Technical Specifications described above with reference to FIG. 1 relative to the present invention is summarized as follows:

When the UE sends a REGISTER request to the network, it includes the IMPI in the Authorization header field (possibly base64 encoded). The P-CSCF receives the request and forwards the request (step 4) to the S-CSCF unmodified.

On receiving a REGISTER request from an unauthenticated user, the S-CSCF (step 8) requires at least one authentication vector (AV) to be used in the challenge to the user. If a valid AV is not available, then the S-CSCF requests at least one AV from the HSS.

The S-CSCF sends a 401 Unauthorized response to the UE (steps 9-11) containing the RAND and AUTN parameters. This message also includes the session keys IK and CK. The P-CSCF removes and stores the IK and CK keys before forwarding the response to the UE.

Upon receiving the response from the S-CSCF, the UE uses the RAND parameter to derive the IK and CK keys (step 12).

The UE sends a new REGISTER request (step 13) to the network, including its IMPI which integrity protects the message using IK. Upon receiving the request, the P-CSCF verifies the integrity of the REGISTER request using IK and forwards (steps 15 and 17) the message to the S-CSCF only when the verification was successful. In addition, the P-CSCF needs to signal to the S-CSCF that this message was received with integrity protection. After receiving the request, the S-CSCF performs whatever action is needed to register the subscriber and returns a 200 OK response (steps 20-22) to the UE.

In IMS, the user is authenticated in the S-CSCF during registration. The message origin verification is delegated from the S-CSCF to the P-CSCF. Currently it is not clear how the message origin verification can be done in P-CSCF. The IMPI (IMS Private Identity) is not present in messages other than REGISTER requests and using the IMPUs (IMS Public Identity) for this purpose is not appropriate.

SUMMARY OF THE INVENTION

The invention is a system and method which produces a temporary IMPI (hereinafter TIMPI) used in IMS for message origin verification. The invention further includes the use of the TIMPI for message origin verification in IMS with the SIP protocol.

A communication method in a network providing services for subscribers having private identities in accordance with the invention includes receiving at a network element a communication from user equipment including a private identity of the subscriber; and assigning a random string to the private identity. The random string may be delivered to the user equipment. The random string may be used for message origin verification in a forthcoming communication from the user equipment. The communication from the user equipment may be integrity protected. The communication from the user equipment may be a SIP Register request. The random string may be delivered to the user equipment by using an acknowledgement message. The acknowledgement message may be a SIP 200 OK message. The network element may be a serving network element to which the subscriber registers for services. The serving network element may be a S-CSCF. The random string may be saved in a proxy network element disposed between the user equipment and a serving network element. The proxy network element may be a P-CSCF. The message origin verification may take place in the proxy network element.

A communication system providing services for subscribers having private identities in accordance with the invention includes a user equipment; and a network element; and wherein the network element receives a communication from the user equipment and the network element assigns a random string to the private identity. The communication system may deliver the random string to the user equipment. The communication system may use the random string to perform verification of a forthcoming communication from the user equipment. The communication from the user equipment may be integrity protected. The communication from the user equipment may be a SIP Register request. The communication system may deliver the random string to the user equipment as part of an acknowledgement message. The acknowledgement message may be a SIP OK message. The network element may be a serving network element to which the subscriber registers for services. The serving network element may be a S-CSCF. A proxy network element may be disposed between the user equipment and a serving network element which saves the random string. The serving network element may be a S-CSCF and the proxy network element may be a P-CSCF. Message origin verification may take place in the proxy network element.

BRIEF DESCRIPTION OF THE DRAWING

Like parts throughout the drawings are identified in the same manner.

DESCRIPTION OF THE PREFERRED EMBODIMENT

The invention uses a TIMPI for the message origin verification in IMS with the SIP protocol. Using a TIMPI solves many of the problems of the prior art. The use of a TIMPI in accordance with the invention is preferably used within IMS in association with the SIP protocol but is not limited thereto.

Figure 1:
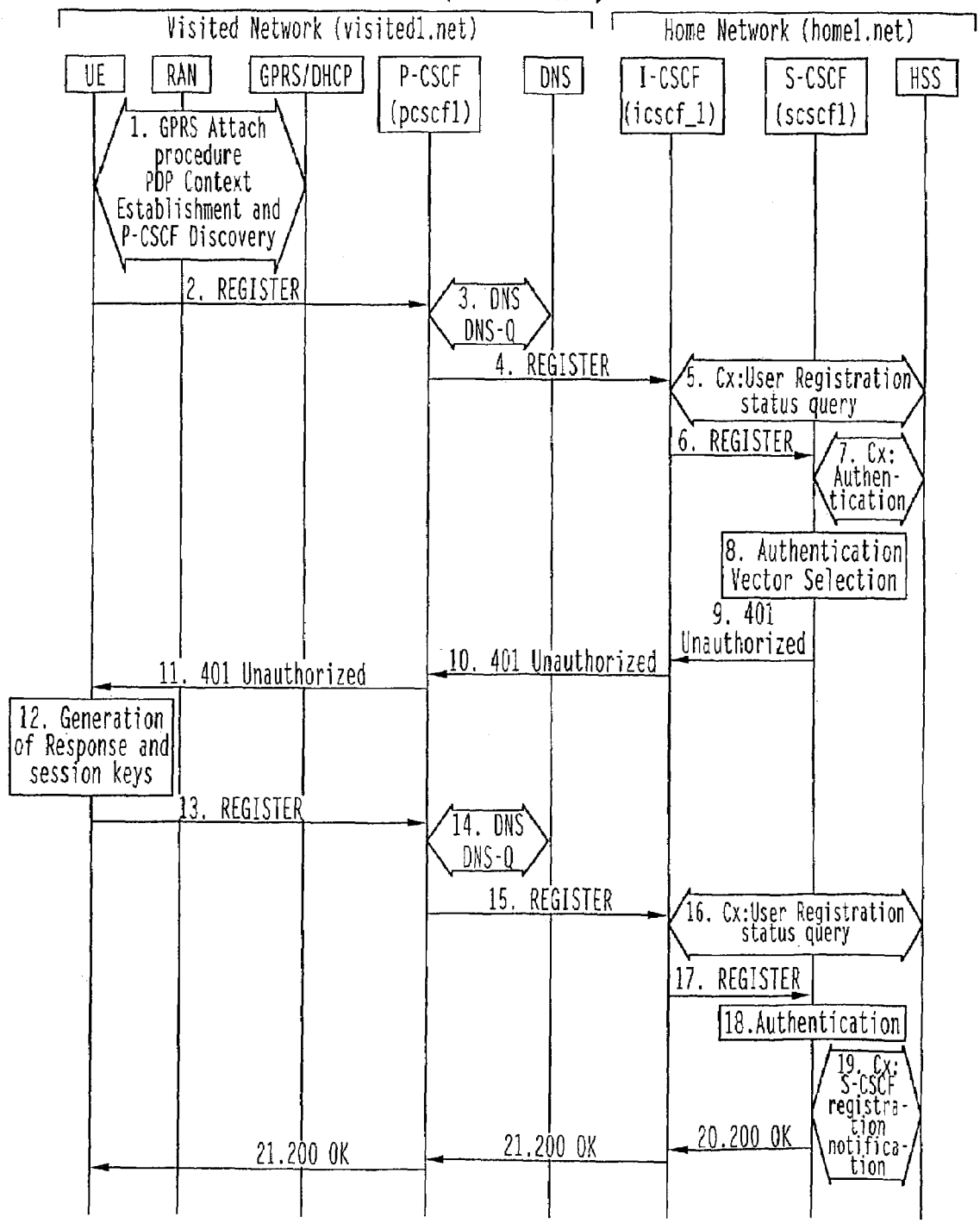
FIG. 1 illustrates the prior art registration signaling for a SIP user registration.
Figure 2:
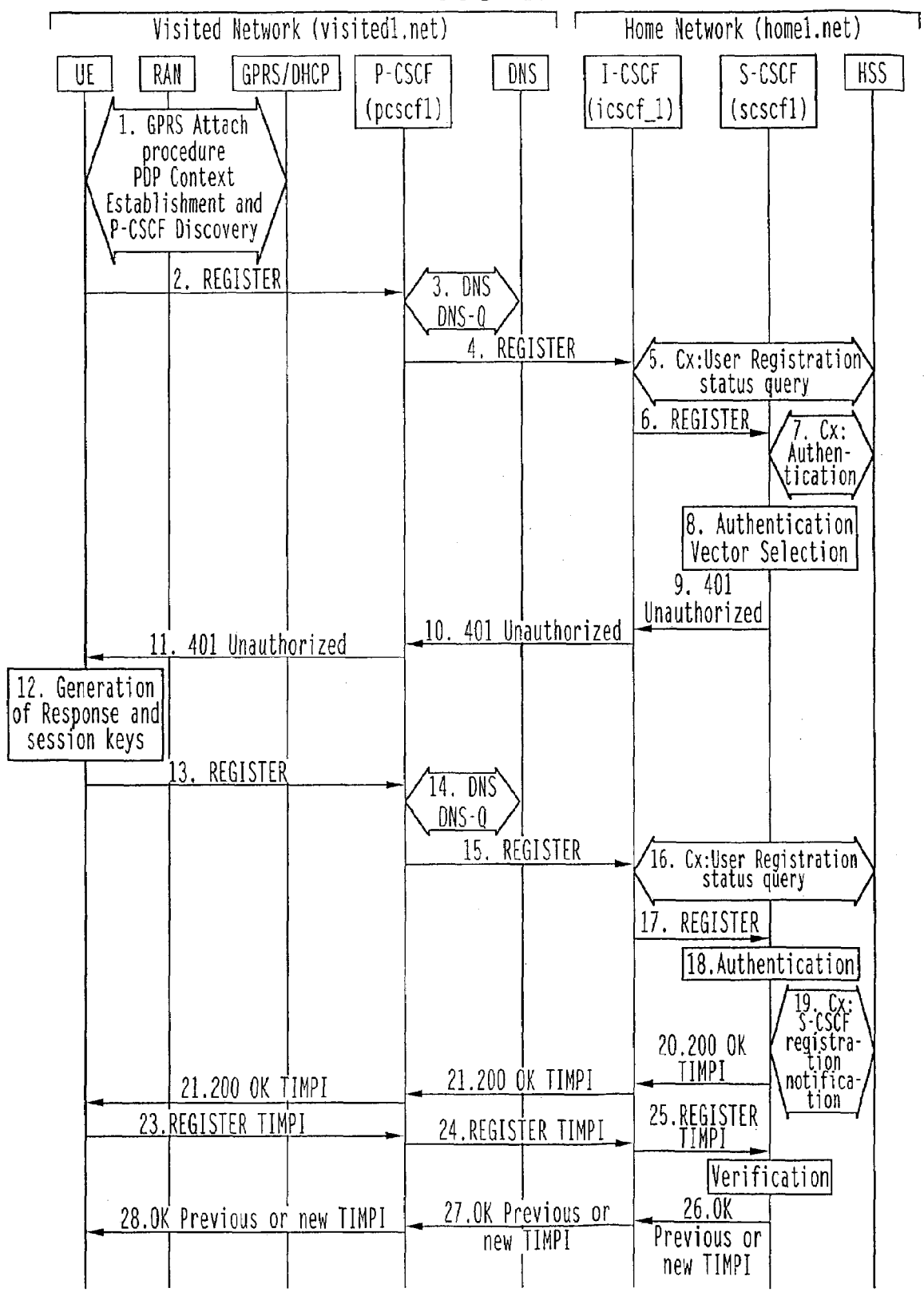
FIG. 2 illustrates user registration for IMS in accordance with the present invention.

The registration and authentication procedure of the invention is as follows with reference to FIG. 2 which is identical with the prior art through steps 1-19 described above with reference to FIG. 1. Steps 1-19 are not described in detail hereinafter. When the S-CSCF at step 17 receives an integrity protected REGISTER request from the UE, which contains the user's IMPI, the S-CSCF generates a random string. This random string is associated with the user's IMPI to form the TIMPI and is returned to the UE in the 200 OK response to the REGISTER request as steps 20-22. The P-CSCF needs to snoop the 200 OK response and saves the random string with the TIMPI together with the IK and CK session keys of the user. The random string plays the role of a TIMPI. The 200 OK response to the REGISTER request carrying the TIMPI is integrity protected and as such it is not possible to be modified by an intruder over the air interface. This is the reason for inserting TIMPI in the 200 OK message rather than in a 401 Unauthorized Response.

For optimization purposes, the S-CSCF should not generate the random identifier right after receiving an unprotected REGISTER request. If it does so, a hole is opened for Denial of Service (DoS) attacks, as an integrity protected REGISTER request may not follow a 401 Unauthorized Response.

The TIMPI is inserted by the UE in all of the messages (step 23) sent towards the P-CSCF which may without limitation be in the authorization header field. The P-CSCF performs message origin verification by simply checking if the IK and the temporary TIMPI are associated. The P-CSCF does not need to know about the possible implicitly registered IMPUs of the subscriber.

When a REGISTER request (step 23) is sent by a UE, having a valid TIMPI, to the network, it contains TIMPI and is integrity protected. Upon receiving the request (step 25), the S-CSCF does a verification rather than a new authentication. Since the TIMPI is associated with the user's IMPI, the S-CSCF can safely update the registration time of the user to the requested one. The S-CSCF may provide a new TIMPI and return the new TIMPI to the user, or the S-CSCF may return the previous TIMPI to the user as part of an OK message as illustrated with steps 26-28, meaning that the old TIMPI is still valid.

The table below lists possible cases of how a REGISTER request is sent by UE. The P-CSCF action, upon the REGISTER request (step 23), is specified below:

|  | Integrity protected | No integrity protection |
| --- | --- | --- |
| IMPI included | Allowed<br>Not recommended | Allowed<br>P-CSCF has to signal to S-CSCF the no protection |
| TIMPI included | desired | Not allowed<br>Message shall be silently discarded |

When the S-CSCF receives an integrity protected REGISTER request (step 25) from the UE, which contains the user's TIMPI, the S-CSCF generates the random string. The random string of the user's TIMPI is associated with the user's IMPI and is returned to the user or a new TIMPI is generated by the S-CSCF and returned in the 200 OK response to the REGISTER request (steps 26-28). The P-CSCF examines the 200 OK response and saves the random string together with the IK and CK session keys of the user. The random string plays the role of a temporary IMPI. The 200 OK response to the REGISTER request carrying the TIMPI (steps 26-28) is integrity protected and as such it is not possible to be modified by an intruder over the air interface. This is the reason for inserting the TIMPI in the 200 OK message rather than 401 Unauthorized response message).

While the invention has been described in terms of its preferred embodiment, it should be understood that numerous modifications may be made thereto without departing from the spirit and scope of the present invention. It is intended that those modifications fall within the scope of the appended claims.

The invention claimed is:

1. A method, comprising:
   receiving at a network element a communication from user equipment including a private identity of the subscriber, wherein the communication from the user equipment comprises a session initiation protocol register request and wherein the communication is an integrity protected communication;
   assigning, by the network element, a random string to the private identity, wherein the random string is configured to serve as a temporary private identity; and
   delivering the random string to the user equipment using integrity protected communication.

2. The method according to claim 1, further comprising:
   using the random string for message origin verification in a forthcoming communication from the user equipment.

3. The method according to claim 1, wherein the delivering the random string to the user equipment uses an acknowledgement message.

4. The method according to claim 3 further comprising:
   configuring the acknowledgement message to be a session initiation protocol 200 OK message.

5. The method according to claim 1, further comprising:
   configuring the network element to be a serving network element to which the subscriber registers for services.

6. The method according to claim 5, further comprising:
   configuring the serving network element to be a serving call state control function.

7. The method according to claim 1, further comprising:
   saving the random string in a proxy network element disposed between the user equipment and a serving network element.

8. The method according to claim 7, further comprising:
   configuring the serving network element to be a serving call state control function; and configuring the proxy network element to be a proxy call state control function.

9. The method according to claim 7, further comprising:
performing message origin verification in the proxy network element.

10. The method according to claim 9, further comprising:
configuring the proxy network element to be a proxy state control function.

11. A system, comprising:
a user equipment; and
a network element configured to receives a communication from the user equipment, to assign a random string to the private identity, wherein the random string is configured to serve as a temporary private identity, wherein the communication from the user equipment comprises a session initiation protocol register request, and wherein the communication is an integrity protected communication, and to deliver the random string to the user equipment using integrity protected communication.

12. An apparatus, comprising:
reception means for receiving a communication from user equipment including a private identity of a subscriber, wherein the communication from the user equipment comprises a session initiation protocol register request and wherein the communication is an integrity protected communication;
assigning means for assigning a random string to the private identity, wherein the random string is configured to serve as a temporary private identity; and
delivery means for delivering the random string to the user equipment using integrity protected communication.

13. the apparatus of claim 12, further comprising:
verification means for using the random string for message origin verification in a forthcoming communication from the user equipment.

14. An apparatus, comprising:
a receiver configured to receive a communication from a user equipment including a private identity of a subscriber, wherein the communication from the user equipment comprises a session initiation protocol register request and wherein the communication is an integrity protected communication;
a processor configured to assign a random string to the private identity, wherein the random string is configured to serve as a temporary private identity; and
a transmitter configured to deliver the random string to the user equipment using integrity protected communication.

15. The apparatus of claim 14, wherein the processor is further configured to use the random string to perform verification of a forthcoming communication from the user equipment.

16. The apparatus of claim 14, wherein the transmitter is configured to deliver the random string to the user equipment as part of an acknowledgement message.

17. The apparatus of claim 16, wherein the acknowledgement message is a session initiation protocol OK message.

18. The apparatus of claim 14, wherein the apparatus comprises or is comprised in a serving network element to which the subscriber registers for services.

19. The apparatus of claim 18, wherein the serving network element is a serving call state control function.

* * * * *

UNITED STATES PATENT AND TRADEMARK OFFICE
CERTIFICATE OF CORRECTION

PATENT NO. : 7,624,266 B2  Page 1 of 1
APPLICATION NO. : 10/384058
DATED : November 24, 2009
INVENTOR(S) : Bajkó Gábor It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 953 days.

Signed and Sealed this

Twenty-sixth Day of October, 2010

David J. Kappos
*Director of the United States Patent and Trademark Office*